United States Patent
Siefert

(10) Patent No.: US 6,495,806 B2
(45) Date of Patent: *Dec. 17, 2002

(54) CLOSED LOOP SYSTEM AND METHOD FOR HEATING A PROBE

(75) Inventor: Robert J. Siefert, Escondido, CA (US)

(73) Assignee: Alaris Medical Systems, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/080,011

(22) Filed: Feb. 21, 2002

(65) Prior Publication Data

US 2002/0079310 A1 Jun. 27, 2002

Related U.S. Application Data

(63) Continuation of application No. 09/313,824, filed on May 18, 1999, now Pat. No. 6,355,916.

(51) Int. Cl.[7] .............................. H05B 1/02; G01K 7/42; A61B 6/00
(52) U.S. Cl. .................. 219/494; 219/497; 374/164; 600/549; 700/300; 702/131
(58) Field of Search .................. 374/164, 185; 219/494, 497; 702/131; 700/299, 300; 600/549

(56) References Cited

U.S. PATENT DOCUMENTS

| | | | | |
|---|---|---|---|---|
| 3,586,830 A | * | 6/1971 | Leitner et al. ............... | 219/497 |
| 3,729,998 A | * | 5/1973 | Mueller et al. ............. | 374/164 |
| 3,832,902 A | * | 9/1974 | Usami et al. ................ | 374/164 |
| 4,158,965 A | * | 6/1979 | Prosky ........................ | 374/164 |
| 4,183,248 A | * | 1/1980 | West ........................... | 374/164 |
| 5,632,555 A | * | 5/1997 | Gregory et al. ............. | 374/102 |
| 6,000,846 A | * | 12/1999 | Gregory et al. ............. | 374/164 |
| 6,036,361 A | * | 3/2000 | Gregory et al. ............. | 374/164 |
| 6,109,784 A | * | 8/2000 | Weiss ......................... | 374/164 |
| 6,146,015 A | * | 11/2000 | Weiss ......................... | 374/164 |
| 6,355,916 B1 | * | 3/2002 | Siefert ........................ | 219/494 |

FOREIGN PATENT DOCUMENTS

| | | | | |
|---|---|---|---|---|
| DE | 2 145 199 | | 4/1972 | ............ G01K/1/20 |
| DE | 32 30 127 A1 | | 2/1984 | ............ G01K/1/20 |
| DE | 41 27 645 A1 | | 2/1993 | ............ G01K/1/18 |
| WO | 96/07877 A1 | | 3/1996 | ............ G01K/1/14 |

* cited by examiner

*Primary Examiner*—Diego Gutierrez
*Assistant Examiner*—Stanley J. Pruchnic, Jr.
(74) *Attorney, Agent, or Firm*—Fulwider Patton Lee & Utecht, LLP

(57) ABSTRACT

A system and method for rapidly preheating the probe of a thermometer to a temperature closer to the temperature of a patient to be measured. The system comprises a probe heater, a probe temperature sensor, a power source, and a processor for controlling the delivery of energy from the power source to the heater. The processor adds an offset to the drive level to the heater which is dependent on the ambient temperature and the power source voltage to achieve more rapid heater response. The processor maintains control over the drive level applied to the heater in accordance with the temperature sensor so that at all times a closed loop system is provided.

18 Claims, 8 Drawing Sheets

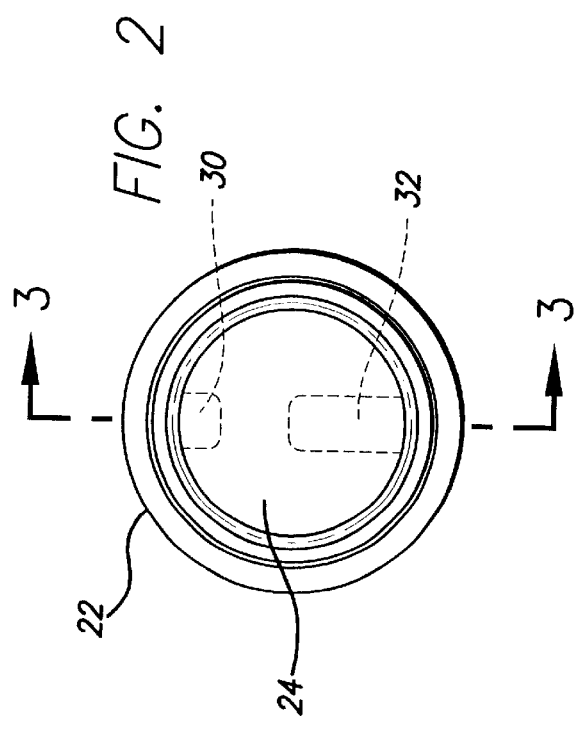
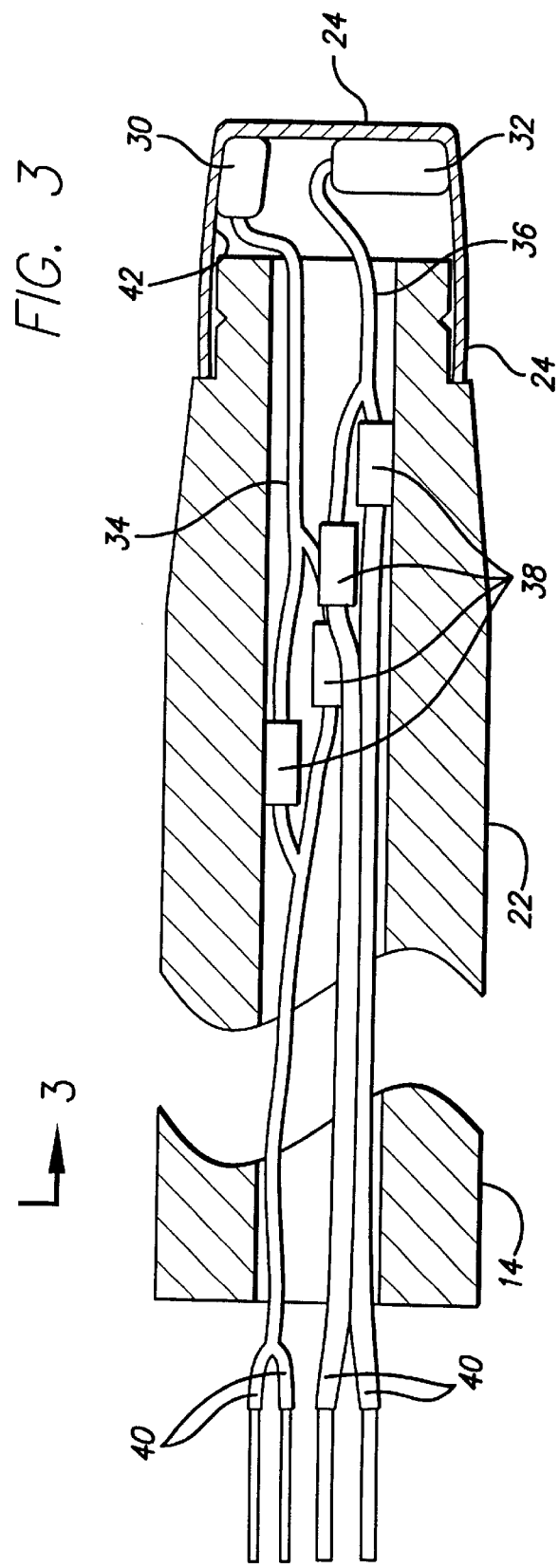

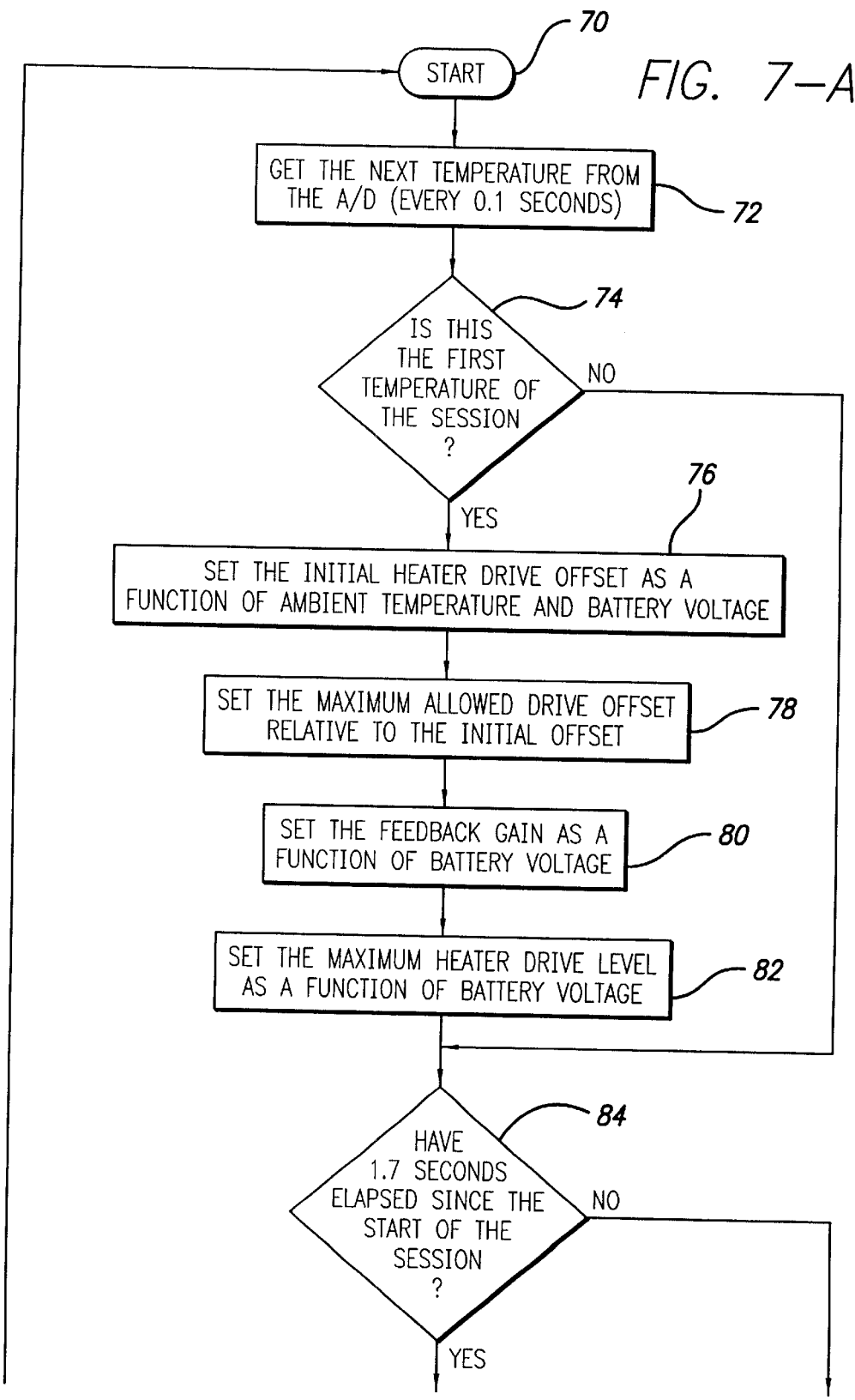
FIG. 7-A

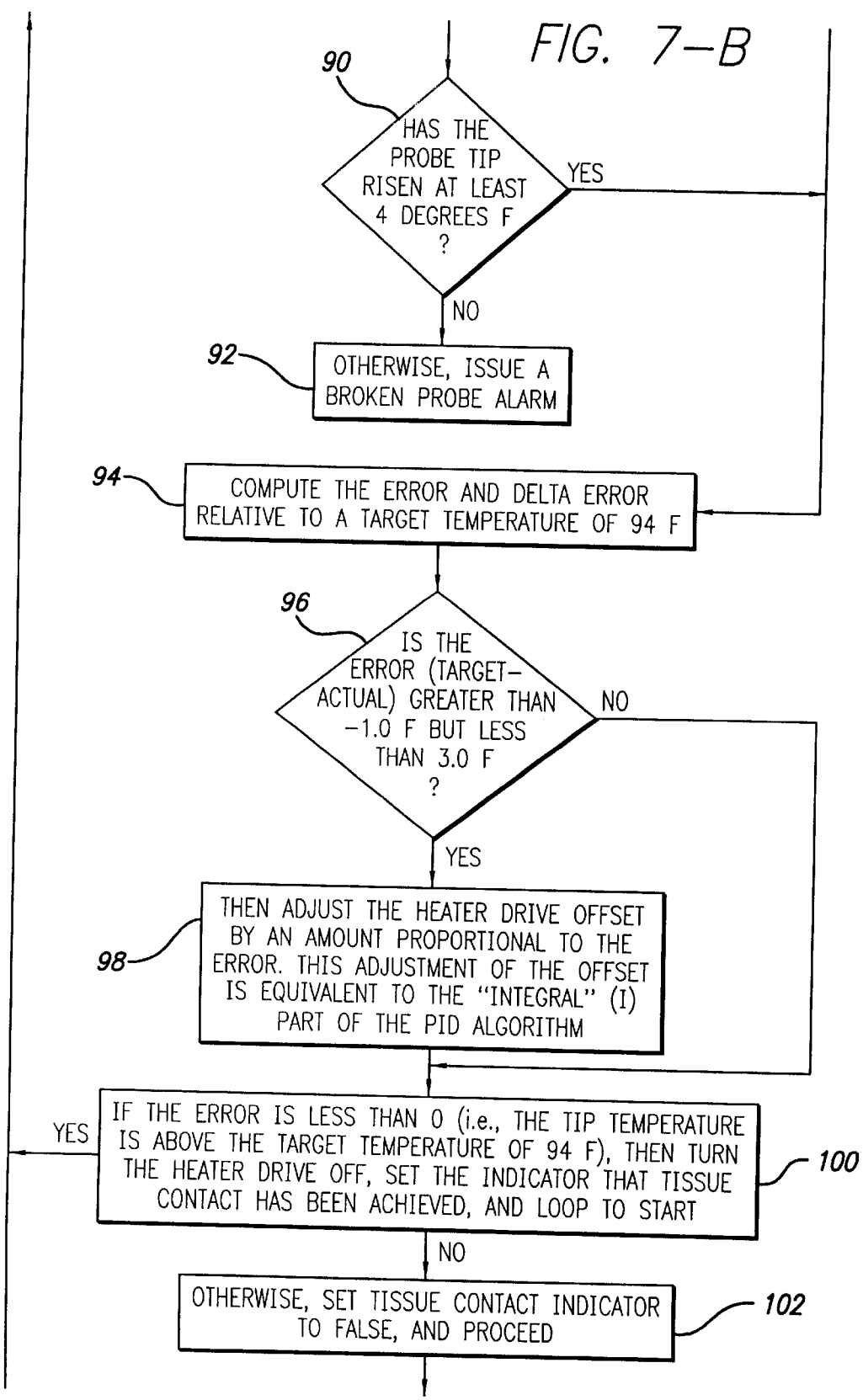

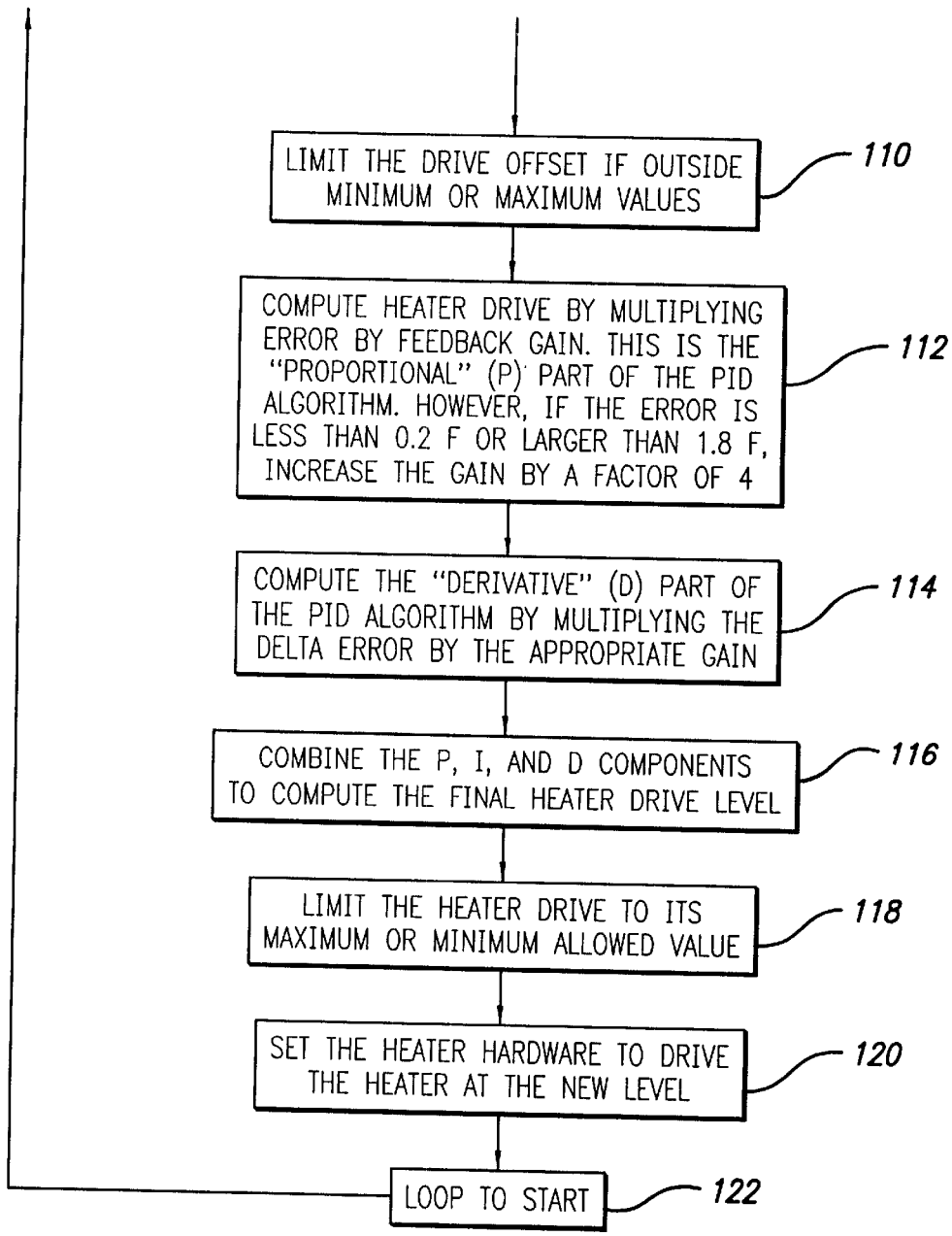
FIG. 7-C

CLOSED LOOP SYSTEM AND METHOD FOR HEATING A PROBE

This is a continuation of application Ser. No. 09/313,824, filed May 18, 1999 now U.S. Pat. No. 6,355,916.

BACKGROUND

The present invention relates generally to improvements in thermometers and, more particularly, to electronic thermometers for more rapidly obtaining accurate temperature measurements.

It is common practice in the medical field to determine the body temperature of a patient by means of a temperature sensitive device that not only measures the temperature but also displays that temperature. Such temperature measurements are taken routinely in hospitals and in doctors' offices. One such device is a glass bulb thermometer incorporating a heat responsive mercury column that expands and contracts adjacent a calibrated temperature scale. Typically, the glass thermometer is inserted into the patient, allowed to remain inserted for a sufficient time interval to enable the temperature of the thermometer to stabilize at the body temperature of the patient, and subsequently removed for reading by medical personnel. This time interval is usually on the order of 3 to 8 minutes.

An electronic thermometer can take one or more minutes in its predictive mode and five or more minutes in its monitoring or direct reading mode. Electronic predictive thermometers have become popular because in their predictive mode, the time for taking the temperature is much less than the mercury thermometer. For busy nursing staffs, time is of the essence. Taking a temperature in one minute is much more desirable than taking a temperature in five minutes. More patients can be served with the faster thermometer and the nursing staff can be more productive.

Additionally, the more time that a probe must be in a patient's mouth to make a temperature determination, the more likely it is that the probe will not remain in the correct location. This is particularly true with younger patients who tend to be impatient. For patients who cannot be relied upon (by virtue of age or infirmity for example) to properly retain the thermometer for the necessary period of insertion in the body, the physical presence of medical personnel during a relatively long measurement cycle is necessary. Taking a temperature of younger patients in one minute is immensely more desirable than taking the temperature in five minutes. Thus, the predictive electronic thermometer has substantially advanced the art of temperature determination.

In addition to the above, rapid reuse on other patients is also a goal. However, with reuse, precaution must be taken to avoid the possibility of cross contamination between patients. Consequently, protective covers have been designed for use with the probes of thermometers. The protective cover is designed to completely envelope the portion of the thermometer that comes into contact with the patient. Because the protective cover may then be removed after use of the thermometer, and because the protective cover has protected the thermometer from contact with the patient, the thermometer may be immediately reused by simply applying another protective cover.

Protective probe covers have been available for predictive electronic thermometers for many years making the thermometer rapidly reusable when properly used with such covers. However, a protective cover adds material between the temperature sensor in the probe of the thermometer and the heat source; i.e., the patient. Additional material between the patient and the sensor can slow down the process of determining the patient's temperature as heat from the patient must first pass through the probe cover before it reaches the sensor. Gains made in permitting immediate reuse of thermometers due to the use of a disposable probe cover may thus be offset by the increasing length of time it takes to obtain a reading, caused by that same probe cover.

An inherent characteristic of electronic thermometers is that they do not instantaneously measure the temperature of the site to which they are applied. It may take a substantial period of time before the temperature sensitive device stabilizes at the temperature of the site and the temperature indicated by the thermometer is representative of the actual temperature of the body or site measured. This lag is caused by the various components of the measurement system that impede heat flow from the surface of the body or site to the temperature sensor. Some of the components are the sensor tip, the tissue of the body, and any hygienic probe covering applied to the sensor tip to prevent contamination between measurement subjects.

One approach to shortening the time required for an electronic thermometer to take an accurate reading of a patient's temperature is to preheat the probe tip of the thermometer to a temperature closer to the expected patient's temperature. Such probe tip heaters have been known for many years. However, the heater must have enough power to rapidly raise the temperature of the probe cover along with the probe tip. The probe cover adds further considerations, as, depending on the materials of construction, it may have a high heat capacity requiring more power on the part of the heater to raise its temperature. Failure to provide a heater with enough power will result in a slower increase in the temperature of the probe cover.

Applying enough heat to the probe tip to raise its temperature and the temperature of the probe cover to a level closer to the patients' temperature will reduce the time required for measurement as there is less difference between the temperature of the probe tip and that of the patient. Shortening the time to obtain the patient's temperature measurement would lessen the risk that the patient would not hold the probe in the correct position for the entire measurement period and requires less time of the attending medical personnel. In addition, the accuracy with which the temperature is predicted improves markedly as the processing and analysis of the data are more accurately performed. This approach has also contributed significantly to the advancement of temperature measurement technology.

A further consideration is the amount of time needed for the probe to preheat. It is undesirable to take the probe out of its well only to have to hold it for a substantial amount of time until it preheats enough to take the patient's temperature. While there is some advantage in that the probe is not in the patient's mouth while it is preheating, it still requires time of the medical staff to hold the probe until it is preheated.

While electronic thermometers have advanced the art of thermometry and preheating the probe tips of thermometers is well known, it would be desirable to increase the speed at which the tip may be heated. This would permit faster determination of the patient's temperature. The invention fulfills these needs and others.

SUMMARY OF THE INVENTION

Briefly and in general terms, the present invention is directed to providing a closed loop system and method for heating the probe of a thermometer. In a more detailed aspect, a closed loop heating system is provided that comprises a sensor mounted to the probe, the sensor configured to sense the temperature of the probe and provide a time varying temperature signal in response to the temperature of the probe, a heater mounted at the probe and responsive to heater control signals to provide heat to the probe, a power source, and a processor connected to the power source, the sensor, and the heater so as to provide a closed loop system in heating the probe, the processor providing a drive level of energy from the power source to the heater to cause the heater to heat the probe, the processor applying an offset to the drive level to the heater, the offset being a non-zero value which is a function of ambient temperature and the power source voltage to more rapidly achieve heating of the probe to a target temperature in a stable controlled fashion.

In a further detailed aspect, the processor senses the temperature of the probe and if the temperature of the probe is below a first threshold, the processor is configured to apply a larger level of drive energy to the heater to cause the probe to heat faster, and upon reaching the first threshold, the processor reduces the drive of battery energy to the heater in a proportional manner, the threshold being dependent on the drive level offset.

A method in accordance with aspects of the invention comprises the steps of sensing the temperature of the probe and providing a time varying temperature signal in response to the temperature of the probe, heating the probe in response to heater control signals, and sensing the temperature of the probe and applying heater control signals in a closed loop manner, wherein the heater control signals are applied to the heater at a drive level, and applying an offset to the drive level to the heater, the offset being a non-zero value which is a function of ambient temperature and the power source voltage to more rapidly achieve heating of the probe to a target temperature in a stable controlled fashion.

These and other features and advantages of the present invention will become apparent from the following more detailed description, when taken in conjunction with the accompanying drawings which illustrate, by way of example, the principles of the invention.

BRIEF DESCRIPTION OF THE DRAWINGS

FIG. 2 is an end-on view of the distal tip of the thermometer probe shown in FIG. 1 without the probe cover being installed;

FIG. 3 is a cross-sectional side view of the distal tip of the thermometer probe shown in FIGS. 1 and 2 taken on lines 3—3 of FIG. 2 and in accordance with aspects of the present invention, showing the internal components of the probe tip including the temperature sensor, the probe tip heater, and wire connections;

FIGS. 7A, 7B, and 7C are a flow or data chart showing the control over the drive level to the probe tip heater shown in FIG. 3.

DETAILED DESCRIPTION OF THE PREFERRED EMBODIMENTS

Figure 1:
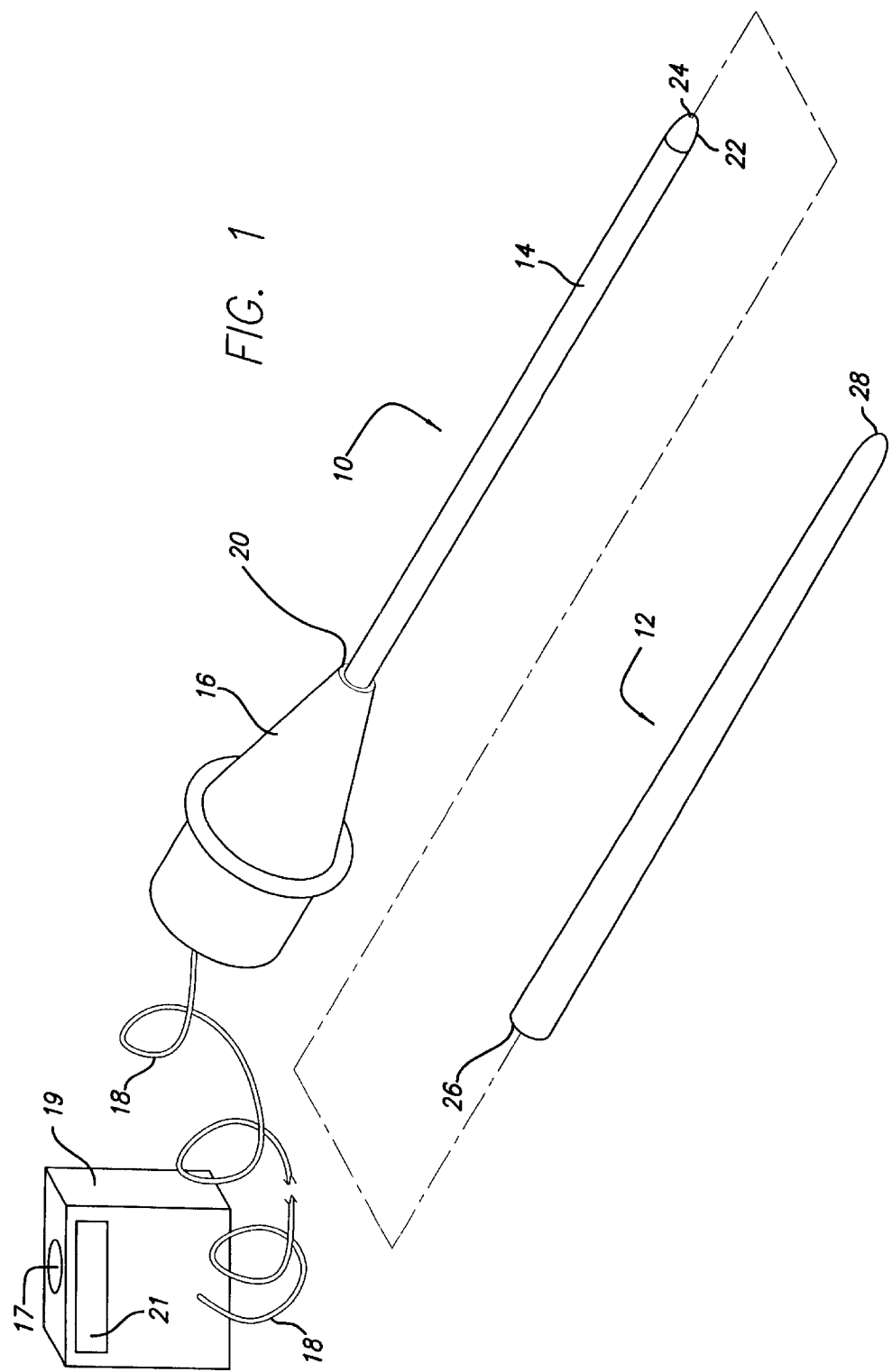
FIG. 1 is a perspective view showing an electronic thermometer probe and probe cover assembly incorporating a probe tip having a temperature sensor and a probe tip heater therein in accordance with aspects of the present invention.

In the following description, like reference numerals will be used to refer to like or corresponding elements in the different figures of the drawings.

Referring now to the drawings, and particularly to FIG. 1, there is shown a thermometer probe 10 and probe cover 12 assembly in accordance with aspects of the present invention that comprises an elongated thermometer probe shaft 14 mounted to a probe housing 16 with a probe storage well 17 and an electric cable 18 extending from a temperature sensing element disposed within the distal tip of the shaft (not shown) through the shaft and housing to the data processing portion 19 of the thermometer (shown in block diagram form for convenience) for measuring and displaying via a display 21 the temperature sensed by a temperature sensing element located in the probe 10. The shaft 14 includes a proximal end 20 mounted within the housing 16 and a distal end 22 with the probe tip 24 mounted thereupon. The elongated probe cover 12 is shaped and sized to fit over the probe shaft 14 and includes an open end 26 to accept the probe shaft 14 into the probe cover 12 and a distal tip 28 to fit snugly and securely over the probe tip 24.

Referring now to the end-on view of FIG. 2, there is shown the probe tip 24. In phantom lines, a probe tip heater 30 and a probe tip sensor 32 are mounted in the probe tip 24. The probe tip sensor 32 makes no physical contact with the probe tip heater 30 and in this embodiment, they are diametrically separated, although other arrangements are possible.

Referring now to FIG. 3 which is a cross-sectional view taken along lines 3—3 of FIG. 2, the heater 30 and sensor 32 are shown as are their respective electrical conductors 34 and 36. These conductors make connections 38 with main body conductors 40 in the probe distal end 22. In this embodiment, the sensor 32 is primarily mounted to the distal end 22 of the probe shaft 14 while the heater 30 is primarily mounted to the distal end wall 42. This configuration permits enough room for both devices in the distal end 22 without their touching each other. Other arrangements are possible.

Figure 4:
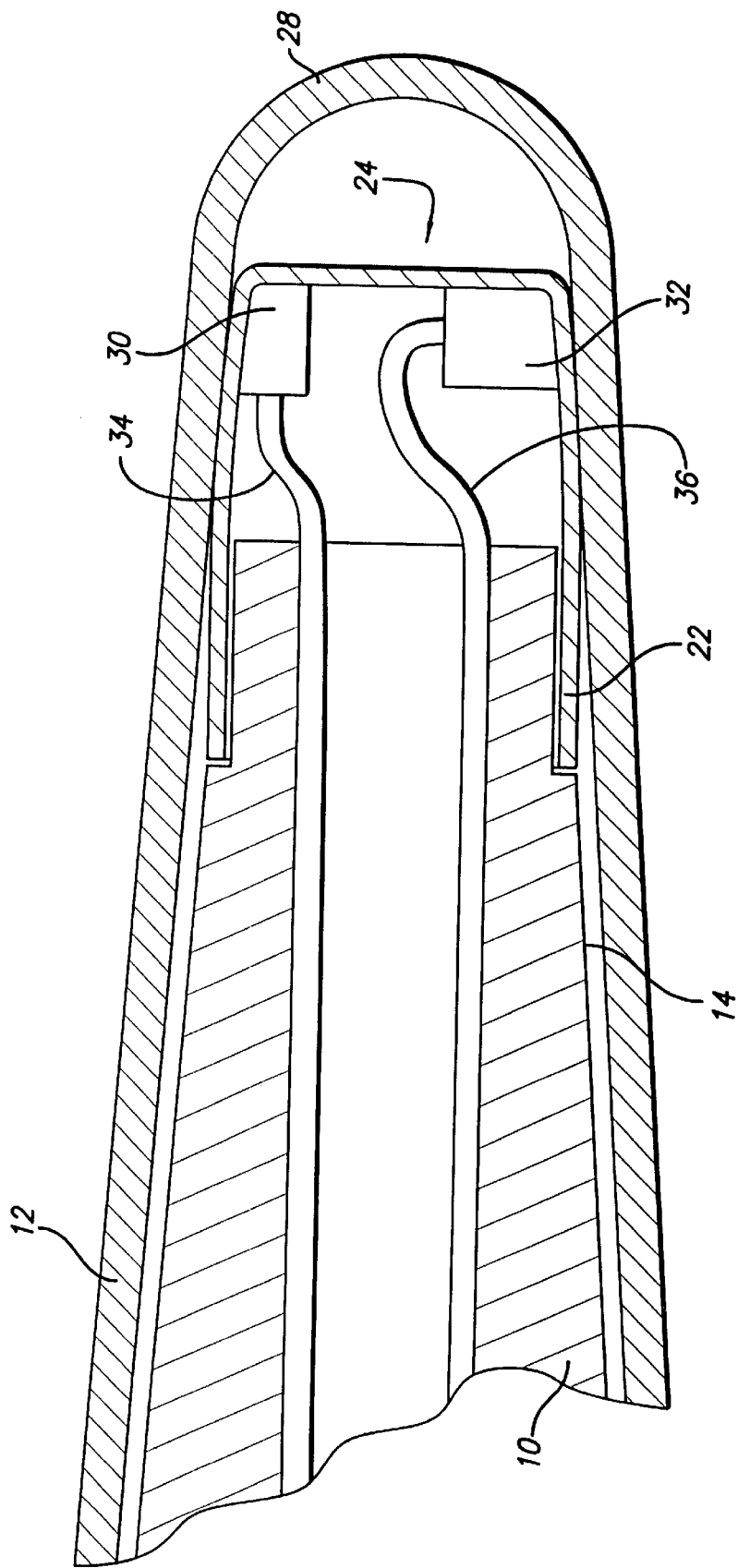
FIG. 4 is a cross-sectional view of the probe and probe cover of FIG. 1 showing the probe cover mounted on the probe and the temperature sensor and probe tip heater.

Referring now to FIG. 4, the same view as in FIG. 3 is presented with the additional element of an installed probe cover 12. As shown, the heater 30 and sensor 32 positions are at locations on the distal end 22 wall which is in contact with the probe cover 12. As mentioned above, the probe cover 12 will be located between the patient and the temperature sensor 32 and will also therefore need to be preheated by the heater 30.

Figure 5:
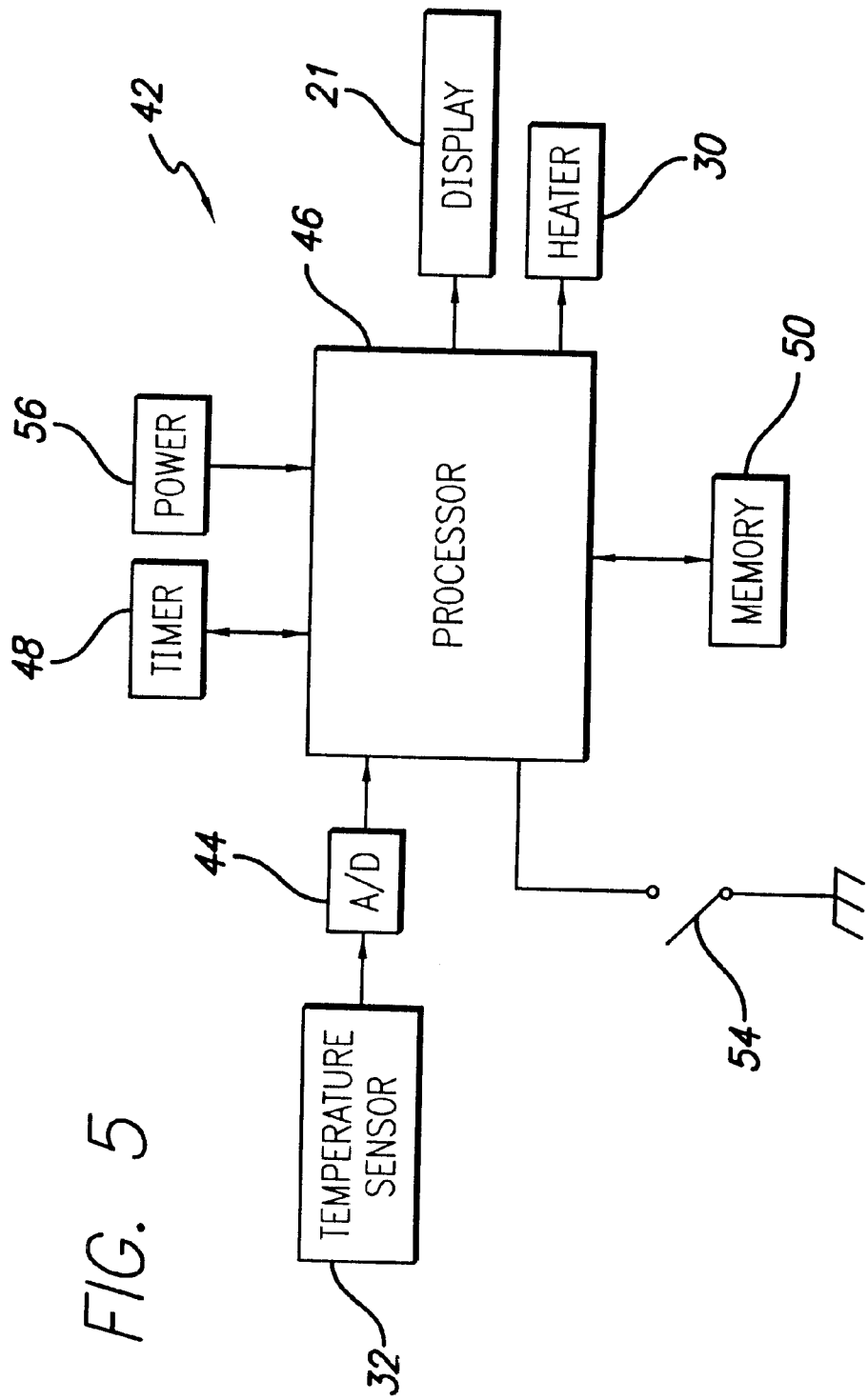
FIG. 5 is a block diagram view of a temperature measurement system incorporating a processor forming a part of the system controlling the temperature of the probe in accordance with aspects of the invention.

Referring to FIG. 5, the block diagram generally shows major electronic components of an electronic thermometer 42. The temperature sensor 32 provides temperature signals in response to the temperature sensed during measurement. In the case where a thermistor is used as the temperature sensor 32, these signals are analog voltages or currents representative of the resistance of the thermistor and therefore representative of the sensed temperature. They are converted into digital form for further processing by an analog-to-digital converter 44. The analog-to-digital converter 44 is connected to a processor 46 that receives the digital temperature signals and processes them to determine the temperature of the subject being measured.

A timer 48 provides time signals to the processor 46 used during the processing of the temperature signals, and a memory 50 stores the temperature and time signal data so that the signal data can be analyzed at a subsequent time. The memory 50 also stores empirically-derived constants used by the processor 46 to control the heater 30 and calculate the temperature. Once the signals have been processed, the processor 46 provides a signal to the display 21 to display the temperature. Activating a switch 54 enables the temperature measurement functions of the thermometer 42. This switch is preferably located within the probe storage well 17 such that removal of the probe enables the measurement. A power source 56, such as a battery, is connected to the processor. The processor controls the application of power to the heater 30, or the heater's drive level, as discussed below.

Figure 6:
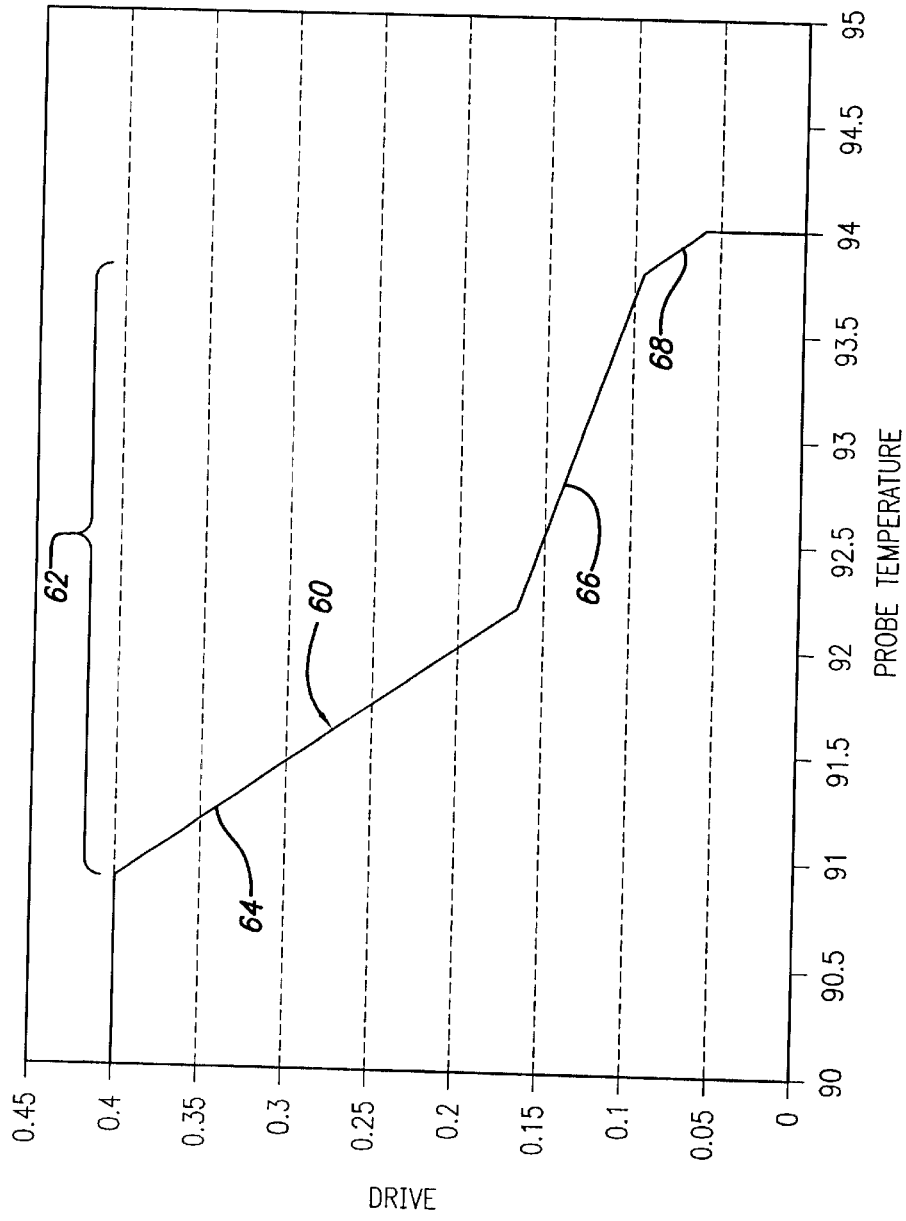
FIG. 6 is a graph showing the drive level applied to the probe tip heater.

Referring now to FIG. 6, a graph of the drive level 60 of the heater is presented. The graph has the axes of drive level and probe temperature. In this embodiment, at 94 degrees F., the drive level is reduced to zero, which means that no energy is applied to the heater when it reaches this temperature. The drive level at lower temperatures is set at 0.4 in this embodiment and is reduced as it reaches a particular temperature as will be discussed below.

In accordance with aspects of the invention, the amount of power applied to the heating element is a function of the difference between a predefined "target" temperature (94 degrees F.) and the tip temperature. Although the basic design of the feedback control loop is that of a "Proportional, Integral, Derivative" (PID) system, novel approaches were incorporated to modify this design.

In a PID heater control system, the "P" component computes a drive level proportional to the temperature error (target-actual). If the tip temperature is close to the target (small error), the "P" component will be small. If the tip temperature is far away (large error), the "P" component of the drive level will be large. If the tip is at the target temperature, the error will be zero, and the "P" component of the drive level will be zero. However, under normal conditions, a non-zero drive level must be maintained to keep the tip at or near the target temperature. Therefore, an offset must be added to the "P" component to attempt to maintain a zero error under existing conditions (e.g., in a cool room, a larger offset will be needed). As conditions vary (e.g., room temperature, variability of instrument components, etc.), it is often necessary to make small adjustments to the offset to maintain zero error. If adjustments to the offset are proportional to the error, then the offset, which is the sum of the adjustments, will essentially be proportional to the "Integral" of the error. This is the "I" part of PID.

The "D" component is proportional to the rate of change of the tip temperature. Its purpose is to improve stability by adjusting the drive level if the tip temperature is rapidly increasing or decreasing. Under certain system configurations, the "D" component will minimize overshoot.

Returning to the examination of the "P" and "I" components, the "P" component is responsible for rapidly driving the tip temperature to the target temperature when they are substantially different. The "I" component is responsible for making small adjustments to maintain the tip at or near the target temperature during slowly varying conditions. The "I" component could be considered the "adaptive" part of the algorithm that compensates for changing room temperature, battery voltage, component tolerances, etc.

In a patient thermometer, the goal is to heat the probe tip as quickly as possible. In most cases, tissue contact will be established before the tip reaches the target temperature. The faster the probe can heat, the sooner a predicted temperature can be computed.

In order to heat the tip quickly, in a controlled manner, without severe overshoot, it is necessary to immediately set the drive offset at or near its correct value. There is not enough time for the slow, adaptive "I" component to drive it toward its correct value. In accordance with the invention, the proper drive offset was empirically determined to be a function of ambient temperature and battery voltage. Thus the initial offset was set according to this derived function and not merely initialized to zero, as with a typical PID controller. In addition, while the probe tip is heating but still far away from target temperature, the "I" part of the algorithm is inhibited from adjusting the drive offset. The drive offset has already been set to its optimum value and should not be altered until the tip temperature is close to the target temperature. Therefore, offset adjustment by the "I" part of the PID algorithm is restricted to those times when the error is within a predetermined range. This prevents the algorithm from manipulating the offset during the time when the error is large and the "P" part of the algorithm is quickly driving the tip temperature toward the target temperature. Once the tip temperature is close to the target, and tissue contact has not been achieved, the "I" part of the algorithm can make small adjustments to the offset to adapt to the current environment.

Significant delays between changing the heater drive level to sensing an effect at the temperature sensor exist. Loop gains for either the "P" or the "I" components must be kept small to ensure loop stability. Since the goal is to quickly heat the probe tip, standard PID techniques are insufficient. As described above, the drive offset has to be initialized to a precomputed value, and the adaptive, "I", component momentarily disabled. In addition, the "P" component requires novel customization to achieve rapid heating while preserving loop stability. To maintain stability, the loop gain associated with the "P" component has to be severely limited. However, for errors outside a predetermined range, the loop gain is dramatically increased. The increased gain allows the heater drive to be higher for a large error, and thus heat the tip more quickly. Once the tip approaches target temperature, the error enters the "control zone" 62 where the gain is reduced to ensure loop stability. The amount of gain is predetermined as a function of battery voltage. In addition, the maximum allowed drive level is predetermined as a function of battery voltage. If the drive level 60 were allowed to get too high, the stored energy and the thermal delays would allow the tip temperature to severely overshoot the target temperature.

In accordance with the embodiment shown in FIG. 6, the drive level 60 is modified once it reaches the control zone 62. The temperatures at which the drive level changes is controlled by the offset. In the case of FIG. 6, the drive level below the control zone 62 is set at 0.4. Once inside the control zone, the drive level rapidly reduces in a first segment 64. In a second segment 66, the slope is approximately one-fourth that of the first segment allowing for less change of the drive level in regard to the temperature. In a third and final segment 68, the slope of the drive level once again resumes at the four times greater value. In this drive control approach, the drive level is altered in steps rather than varied continuously. However, other approaches may be possible.

Referring finally to FIGS. 7A through 7C, a heater control flow chart is presented. In accordance with this flow chart, from the start step 70, the routine next gets the next temperature from the A-to-D converter every 0.1 seconds 72. Next a decision is made as to whether this is the first temperature of the session 74. If so, the initial heater drive offset is set as a function of ambient temperature and battery voltage 76. The maximum allowable drive offset is then set in step 78 to a value relative to the initial drive offset evaluated in step 76. In addition, the feedback gain is set as a function of the battery voltage or other power source voltage in step 80 and the maximum heater drive level is set as a function of the battery voltage in step 82. If this is not the first temperature of the session, no initial heater drive offset (76), maximum allowable drive offset (78), feedback gain (80), or maximum heater drive level (82) are set and instead, the routine proceeds through the "NO" branch to decision step 84, described below.

A decision is then made to determine whether the probe is broken. If 1.7 seconds have elapsed since the start of the session in decision 84 and the probe tip has not risen by at least 4 degrees F. in decision 90, then a broken probe alarm is issued in step 92. Otherwise, the error between the target temperature and the device temperature, and the delta error, or rate of change of the error, are computed in step 94.

Next, a decision is made to determine whether the heater drive level should be adjusted by a drive offset. If the error (target temperature to actual temperature) is greater than −1.0 degrees but less than 3.0 degrees in decision 96, then the heater drive offset is adjusted in step 98 by an amount proportional to the error evaluated. This adjustment to the heater drive offset is equivalent to the "I" or Integral component of the PID algorithm. If the error does not meet these thresholds, then no adjustment is made to the heater drive offset level. Next, a decision is made whether tissue contact has been achieved in step 100. This decision is also made if in decision 96, the error does not meet the temperature thresholds. If the error is less than 0, then the tip temperature is above the target temperature of 94 degrees F. and tissue contact has been made. If this is the case, the heater is turned off, the indicator is set to show tissue contact has been achieved and the loop begins again at step 70.

If it is decided in 100 that tissue contact has not been made, the tissue contact indicator is set to false in step 102. Next, in step 110, the drive offset is limited if it would be outside minimum or maximum offset values. A heater drive level is then computed in step 112 by multiplying the error computed in step 94 by the feedback gain to determine the "P" or proportional component of the "PID" algorithm. However if the error is less than 0.2 degrees F. or larger than 1.8 degrees F., the gain is increased by a factor of 4. The next step 114 computes the "D" or derivative component of the "PID" algorithm by multiplying the delta error computed in step 94 by the gain.

The following step 116 combines the "P", "I", and "D" components to compute a final heater drive level. This final value is then limited in step 118 to lie between the minimum and maximum allowable values. Once the new value for the heater drive level has been computed, the heater hardware is set in step 120 to drive the heater at the new level and the cycle loops at step 122 to start again at step 70.

While one form of the invention has been illustrated and described, it will be apparent that further modifications and improvements may additionally be made to the device and method disclosed herein without departing from the scope of the invention. Accordingly, it is not intended that the invention be limited, except as by the appended claims.

What is claimed is:

1. A closed loop heating system for heating a probe, comprising:

a sensor mounted to the probe, the sensor configured to sense the temperature of the probe and provide a time varying temperature signal in response to the temperature of the probe, a heater mounted at the probe and responsive to heater control signals to provide heat to the probe;

a power source having a voltage; and a processor connected to the power source, the sensor, and the heater so as to provide a closed loop system in heating the probe, the processor providing a drive level of power from the power source to the heater to cause the heater to heat the probe, the processor applying a drive level offset to the drive level to the heater, the drive level offset being a non-zero value which is a function of ambient temperature to more rapidly achieve heating of the probe to a target temperature in a stable controlled fashion.

2. The closed loop heating system of claim 1 wherein the processor senses the temperature of the probe and if the temperature of the probe is below a first threshold, the processor is configured to apply a higher drive level of power to the heater to cause the probe to heat faster, and upon reaching the first threshold, the processor reduces the drive level of power to the heater in a proportional manner, the first threshold being dependent on the drive level offset.

3. The closed loop heating system of claim 1 wherein the processor is further configured to restrict the drive level applied to the heater to a maximum value based upon the source voltage.

4. The closed loop heating system of claim 1 wherein the processor is further configured to apply the non-zero drive level offset to the drive level to maintain the probe at the target temperature, the processor evaluating the non-zero offset as a function of the error between the actual temperature and the target temperature and as a function of the power source voltage.

5. The closed loop heating system of claim 1 wherein the processor is configured to sense the temperature of the probe and if the temperature of the probe is below a first threshold, the processor is configured to apply a higher drive level of power to the heater to cause the probe to heat faster, and upon reaching the first threshold, the processor is configured to reduce the drive level of power to the heater in a non-continuous manner.

6. The closed loop heating system of claim 1 wherein the processor is configured to sense the temperature of the probe and if the temperature of the probe is below a first threshold, the processor is configured to apply a higher drive level of power to the heater to cause the probe to heat faster, and upon the temperature of the probe reaching the first threshold, the processor is configured to reduce the drive level of power to the heater in steps of decreasing drive level.

7. A method of heating a probe in a closed loop manner, comprising the steps of:

sensing the temperature of the probe and providing a time varying temperature signal in response to the temperature of the probe;

applying a drive level of power from a power source to a heater at the probe to heat the probe in response to the time varying temperature signal in a closed loop manner, the power source having a voltage; and applying a drive level offset to the drive level to the heater, the offset being a non-zero value which is a function of ambient temperature to more rapidly achieve heating of the probe to a target temperature in a stable controlled fashion.

8. The method of claim 7 further comprising the step of restricting the drive level applied to the heater to a maximum value based upon the power source voltage.

9. The method of claim 7 further comprising the steps of:

applying the non-zero drive level offset to the drive level to maintain the probe at the target temperature; and evaluating the non-zero offset as a function of the error between the actual temperature and the target temperature and as a function of the power source voltage.

10. The method of claim 7 further comprising:

sensing the temperature of the probe and if the temperature of the probe is below a first threshold, applying a larger level of drive energy to the heater to cause the probe to heat faster, and wherein upon reaching the first threshold, reducing the drive level of power to the heater in a proportional manner, the first threshold being dependent on the drive level offset.

11. The method of claim 7 further comprising:

sensing the temperature of the probe and if the temperature of the probe is below a first threshold, applying a larger level of drive energy to the heater to cause the probe to heat faster, and wherein upon the temperature of the probe reaching the first threshold, reducing the drive level of power to the heater in a non-continuous manner.

12. The method of claim 7 further comprising:

sensing the temperature of the probe and if the temperature of the probe is below a first threshold, applying a larger level of drive energy to the heater to cause the probe to heat faster, and wherein upon the temperature of the probe reaching the first threshold, reducing the drive level of power to the heater in steps of decreasing drive level.

13. A method of heating a probe of a medical thermometer in a closed loop manner to a target temperature, comprising:

sensing on a time varying basis the temperature of the probe and evaluating the difference between the sensed temperature of the probe and the target temperature; and providing a drive level of power from a power source to a heater at the probe in a closed loop manner, the heater configured to heat the probe;

wherein an offset drive level is applied to the drive level to the heater, the offset drive level being a non-zero value that is a function of ambient temperature to more rapidly achieve heating of the probe to the target temperature in a stable controlled fashion.

14. The method of claim 13 further comprising restricting the drive level applied to the heater to a maximum value based upon the source voltage.

15. The method of claim 13 further comprising:

applying the non-zero drive level offset to the drive level to maintain the probe at the target temperature; and evaluating the non-zero offset as a function of the error between the actual temperature and the target temperature and as a function of the power source voltage.

16. The method according of claim 13 further comprising:

sensing the temperature of the probe and if the temperature of the probe is below a first threshold, applying a larger level of drive energy to the heater to cause the probe to heat faster, and wherein upon reaching the first threshold, reducing the drive level of power to the heater in a proportional manner, the first threshold being dependent on the drive level offset.

17. The method of claim 13 further comprising:

sensing the temperature of the probe and if the temperature of the probe is below a first threshold, applying a larger level of drive energy to the heater to cause the probe to heat faster, and wherein upon the temperature of the probe reaching the first threshold, reducing the drive level of power to the heater in a non-continuous manner.

18. The method of claim 13 further comprising:

sensing the temperature of the probe and if the temperature of the probe is below a first threshold, applying a larger level of drive energy to the heater to cause the probe to heat faster, and wherein upon the temperature of the probe reaching the first threshold, reducing the drive level of power to the heater in steps of decreasing drive level.

* * * * *